Jan. 11, 1944.   W. BURNS   2,338,996
POTATO SEED CUTTER
Filed Oct. 19, 1942
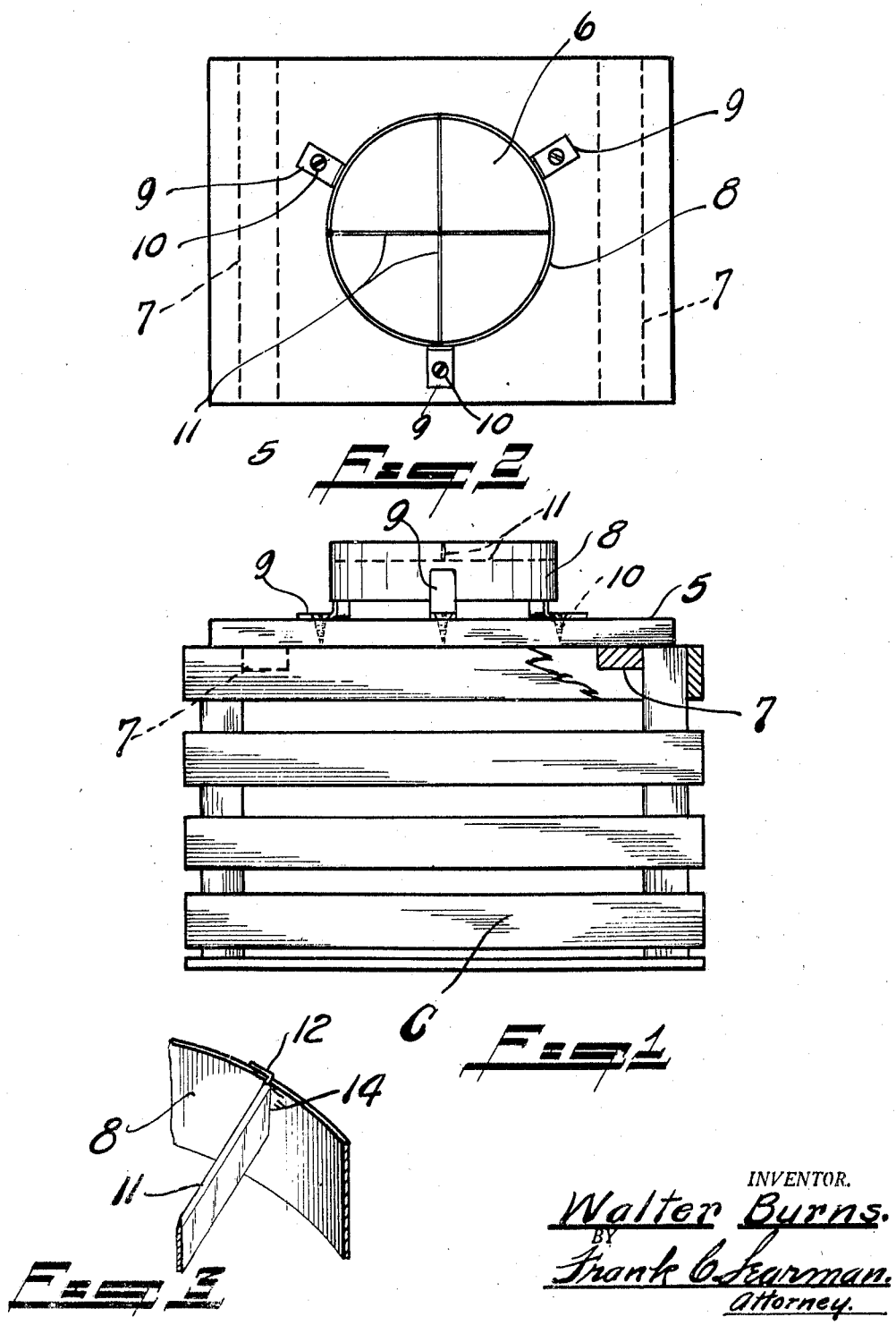
INVENTOR.
Walter Burns.
BY Frank C. Fearman.
Attorney.

Patented Jan. 11, 1944

2,338,996

UNITED STATES PATENT OFFICE 2,338,996

POTATO SEED CUTTER

Walter Burns, Munger, Mich.

Application October 19, 1942, Serial No. 462,651

2 Claims. (Cl. 146—59)

This invention relates to potato cutters by means of which a potato may be cut into pieces to serve as seed in future planting operations.

One of the prime objects of the invention is to design a very simple, practical, and effective cutter for dividing the potato into a number of segments suitable for planting.

Another object is to provide a potato cutter of simple construction which can be economically manufactured and assembled and by means of which potatoes may be cut much more rapidly and economically than at present possible, and with less fatigue to the workman.

A further object is to provide a potato cutter having quickly detachable cutting means to facilitate the sharpening, cleaning, and/or repair of said cutting means.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

In the drawing:

Fig. 1 is a side elevational view showing my cutter mounted on a conventional crate.

Fig. 2 is a top plan view.

Fig. 3 is an enlarged fragmentary, isometric view of the band illustrating an alternate manner of mounting the cutting blades.

Referring now more particularly to the drawing in which I have shown one embodiment of my invention, the numeral 5 indicates a rectangular shaped base provided with a centrally disposed opening 6 therein as shown, cleats 7 are provided directly adjacent each end of the base, and are spaced to snugly fit in a conventional crate "C" when the cutter is placed in position thereon.

A cylindrical shaped band or member 8 is mounted on and extends above the face of the base 5 and is secured thereto by means of brackets 9, the lower ends of the brackets being secured to the base by means of screws 10, as usual, the upper ends being welded to the outer surface of the band as shown.

The cutting elements comprise crossed blades 11 extending across the opening in the upper end of the band 8 and welded to the inner surface thereof, so that the workman may place a potato on the blades, and by exerting downward pressure, the potato will be cut into four segments of uniform size, which segments drop into the crate C, the small potatoes being cut over any portion of the blades, being halved if necessary; and when the crate is filled, the cutter structure is removed and placed on an empty crate for further cutting operations.

As an alternate construction, the brackets 9 can be cast integral with the band 8, the blades 11 being placed in the mold and are also cast integral with the band, thus making a one piece unit.

In Fig. 3 of the drawing, I have shown a slightly different construction, the outer ends 12 of the blades 11 being bent at right angles to the main body, and slits 14 are provided in the upper edge of the band 8 and in which these blades are inserted, this permits easy and quick removal of the blades for cleaning, sharpening or other repair, the bent sections 12 being shaped to conform to the contour of the band to provide tight, frictional contact with the band, and inasmuch as the pressure on the blades is always down, there is no possibility of displacement.

In practice, the workman uses rubberized, canvas, or heavy gloves while cutting, to protect the hands against contact with the sharp edge of the blades.

This cutter very materially cuts down the movements or operations at present necessary in hand cutting; and the rate of cutting can be practically tripled with less fatigue to the workman.

From the foregoing description, it will be obvious that I have perfected a very simple, practical, and inexpensive cutter for cutting seed potatoes.

What I claim is:

1. A cutter comprising a base having a centrally disposed opening therein, cleats secured to the under-side of the base adjacent the ends thereof, and arranged to snugly fit a conventional potato crate, a tubular band mounted on the base above said opening, brackets mounted on the base and supporting said band, open slits in the upper edge of the band, and crossed blades extending across the open upper end of the band and detachably mounted in said slits.

2. A cutter comprising a base having a centrally disposed opening therein, a tubular metallic shell on said base above said opening, brackets supporting said shell above the base, spaced slits in the upper end of the shell, crossed blades extending across the open upper end of the shell and detachably mounted in said slits, the end sections of the blade extending beyond the shell, the extending sections being turned to conform to the curvature of the outer surface of the shell, and to rest in intimate facial contact therewith and cleats mounted on the under-side of the base and spaced to snugly fit a standard potato crate.

WALTER BURNS.